United States Patent [19]

Idler

[11] Patent Number: 4,788,746
[45] Date of Patent: Dec. 6, 1988

[54] CAM ACTUATED SELF-LOCKING HINGE

[75] Inventor: Richard L. Idler, Denver, Colo.

[73] Assignee: Martin Marietta Corporation, Bethesda, Md.

[21] Appl. No.: 749,250

[22] Filed: Jun. 27, 1985

[51] Int. Cl.$^4$ .............................................. E05F 1/08
[52] U.S. Cl. ........................................ 16/297; 16/348; 74/89
[58] Field of Search ................. 16/284, 285, 297, 355, 16/357–359, 362, 376, 348, 309–318, 343–347, 277, 278, 330, 324–328, 303; 49/236–239; 136/245; 74/56, 89

[56] References Cited

U.S. PATENT DOCUMENTS

| | | | |
|---|---|---|---|
| 1,200,538 | 10/1916 | Smith et al. | 16/303 |
| 1,556,204 | 10/1925 | Cohen . | |
| 1,707,628 | 4/1929 | Donosa | 16/330 |
| 2,222,965 | 11/1940 | Voelkel | 16/312 |
| 2,520,642 | 8/1950 | Laurantas | 16/312 |
| 3,919,890 | 11/1975 | Workman | 74/89 |
| 4,155,524 | 5/1979 | Marello et al. | 136/245 |

FOREIGN PATENT DOCUMENTS 1100847  9/1955  France .
1524355  5/1968  France .
7634582  6/1978  France .

Primary Examiner—Frank T. Yost
Assistant Examiner—James L. Wolfe
Attorney, Agent, or Firm—Sughrue, Mion, Zinn, Macpeak, and Seas

[57] ABSTRACT

Concentric tubes, mounted for relative rotation about their common axis, each include radially extending hinge plates. The tubes carry contra-rotational cam slots through which project the ends of a cross-shaft. Bearings on the ends of the cross-shaft engage the milled cam slots. A cylindrical cross roller bearing block mounting the cross-shaft is axially, slidably positioned within the inner tube and is under a biasing force exerted by a compression spring abutting one end of the block. The cam profiles of the slots includes portions at the ends of the slots extending parallel to the rotational axis to lock the inner and outer tubes together at the beginning and end of the stroke with the cam profile controlling the hinge plate acceleration, deceleration, and velocity, in addition to ensuring positive locking of the hinge in plate open and closed position.

4 Claims, 2 Drawing Sheets

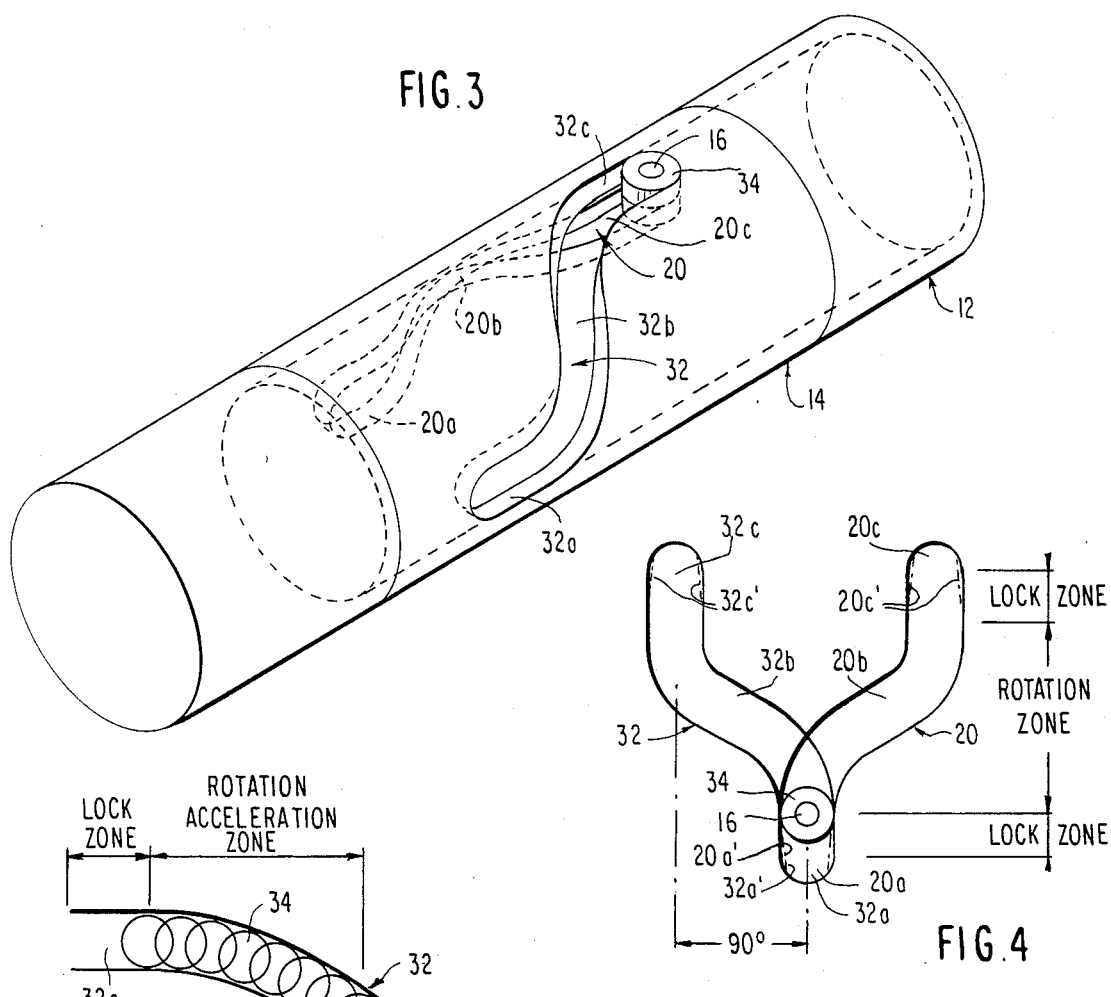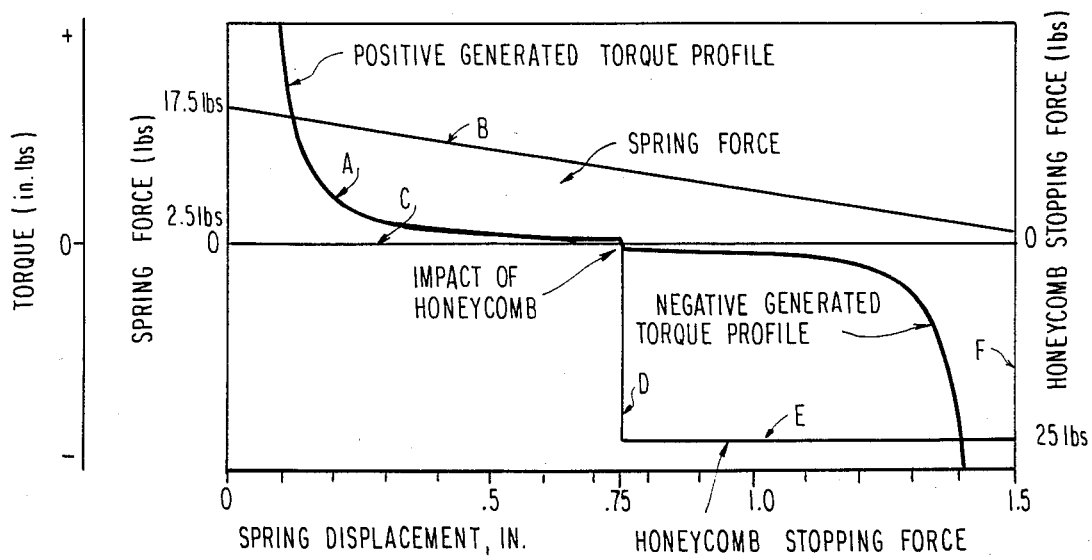

CAM ACTUATED SELF-LOCKING HINGE

FIELD OF THE INVENTION

This invention relates to cam actuated spring biased hinges, and more particularly to an improved self-locking hinge with controlled acceleration, deceleration, velocity and positive locking in open and closed positions for facilitating the deployment of hinged solar panels on spacecraft and the like.

BACKGROUND OF THE INVENTION

Solar panels are normally carried confined within or on the exterior surface of spacecraft, requiring their deployment into radially projected position after orbit is achieved. While the solar panels may be relatively massive, their deployment occurs under conditions of zero gravity force and without significant resistance to deployment, only that of inertia. Accleration and deceleration forces and the velocity of the panel and its deployment components, in moving from retracted to extended position, may have significant load consequences on the panel and the deployment mechanism. The solar panels may be hinged to the spacecraft or to each other along one panel edge. Normal deployment hinges utilize torsion springs for rotation and structures to absorb the energy at the end of the travel. The torsion spring creates a driving force, which supplies the rotational starting force for the development mechanism, which must be resisted after initiation to fully extended position stop using a separate lock to resecure the panels when fully extended.

While the torsion springs function adequately to drive the hinge elements in desired rotation to deploy the solar panel radially outward of the spacecraft, and the heavier than needed structures have been capable of absorbing the energy at the end of travel, such systems are less than ideal and present no effective control for the initial acceleration, velocity, subsequent deceleration, or positive locking of the hinge structure.

It is, therefore, a primary object of the present invention to provide an improved cam actuated self-locking hinge which obviates the problems of the prior torsion spring rotary hinge structures and which facilitates the adaption of the hinge to different torque characteristics and acceleration rates.

It is a further object of the present invention to provide an improved cam actuated self-locking hinge, particularly adapted as a rotary deployment device to facilitate the deployment of solar panels outwardly of a spacecraft in which the solar panels are subjected to controlled acceleration, velocity, and deceleration with positive locking of the panels at the stroke ends of the rotary deployment device.

SUMMARY OF THE INVENTION

The invention is broadly directed to a rotary deployment device in the form of a controlled acceleration, deceleration, self-locking hinge, preferably for the deployment of one solar panel or the like from retracted to extended positions relative to another solar panel on a spacecraft. The hinge comprises concentric inner and outer tubes mounted to each other for rotation about a common axis, each having at least one radially projecting hinge plate for coupling to respective solar panels. Contra-rotational cam slots are provided within respective tubes at common longitudinal locations. A cylindrical cross roller bearing block is slidably mounted internally of the inner tube for axial movement therein. A cross-shaft connected to the block has ends extending through the cam slots of the tubes. A coil spring carried by the hinge operatively engages the block for biasing the block towards one end of the inner tube thereby tending to rotate the tubes relative to each other and the hinge members towards one of hinge open or hinge closed position. The slots each include straight slot end portions in line with the axis of the hinge concentric tubes and an intermediate slot portion at some angle thereto such that the slot end portions are parallel to the rotation center line to lock the inner and outer tubes together at the beginning and end of the stroke. The cam profile further minimizes loads in the rotary deployment device by providing controlled angular acceleration and deceleration during the deployment of one hinge plate relative to the other and the solar panels coupled thereto.

Preferably, the cam slots have a generally S-shaped profile with an oblique center or intermediate portion, and straight parallel end portions. Preferably, rollers are mounted on the ends of the cross-shaft for engaging the slots and are of a diameter sized to the slots so as to rotate in contact with opposite sides of the slots. Anti-friction bearings may be mounted between the inner and outer tubes to support the inner tube for rotation relative to the outer tube. Anti-friction bearings may be incorporated between the cross-shaft ends and the rollers to minimize frictional restraint on the hinge. An energy absorber may be incorporated within the inner tube operatively engaging the block to absorb the deployment forces during the termination of panel deployment. The energy absorber may comprise a mechanically crushable material. Such mechanically crushable material may constitute a honeycomb structure. The ends of the cam slots may taper such that the cross-shaft ends, or the rollers mounted thereto, become wedged to the ends of the slot to facilitate locking of the hinge at hinge open and closed positions.

BRIEF DESCRIPTION OF THE DRAWINGS

FIG. 3 is a diagrammatic perspective view of the hinge concentric tubes showing the cam slot configurations for the contra-rotational cam slots within respective inner and outer tubes of the hinge of FIG. 1.

FIG. 4 is a diagrammatic plan view of the cam slot configuration of the hinge of FIG. 1.

FIG. 5 is a plot of the ramp angle for the cam slots of the hinge of FIG. 1.

FIG. 6 is a plot of the torque, spring force and honeycomb stopping force against spring displacement for the hinge of FIG. 1, with a honeycomb deceleration effect added.

DESCRIPTION OF THE PREFERRED EMBODIMENT

Figure 1:
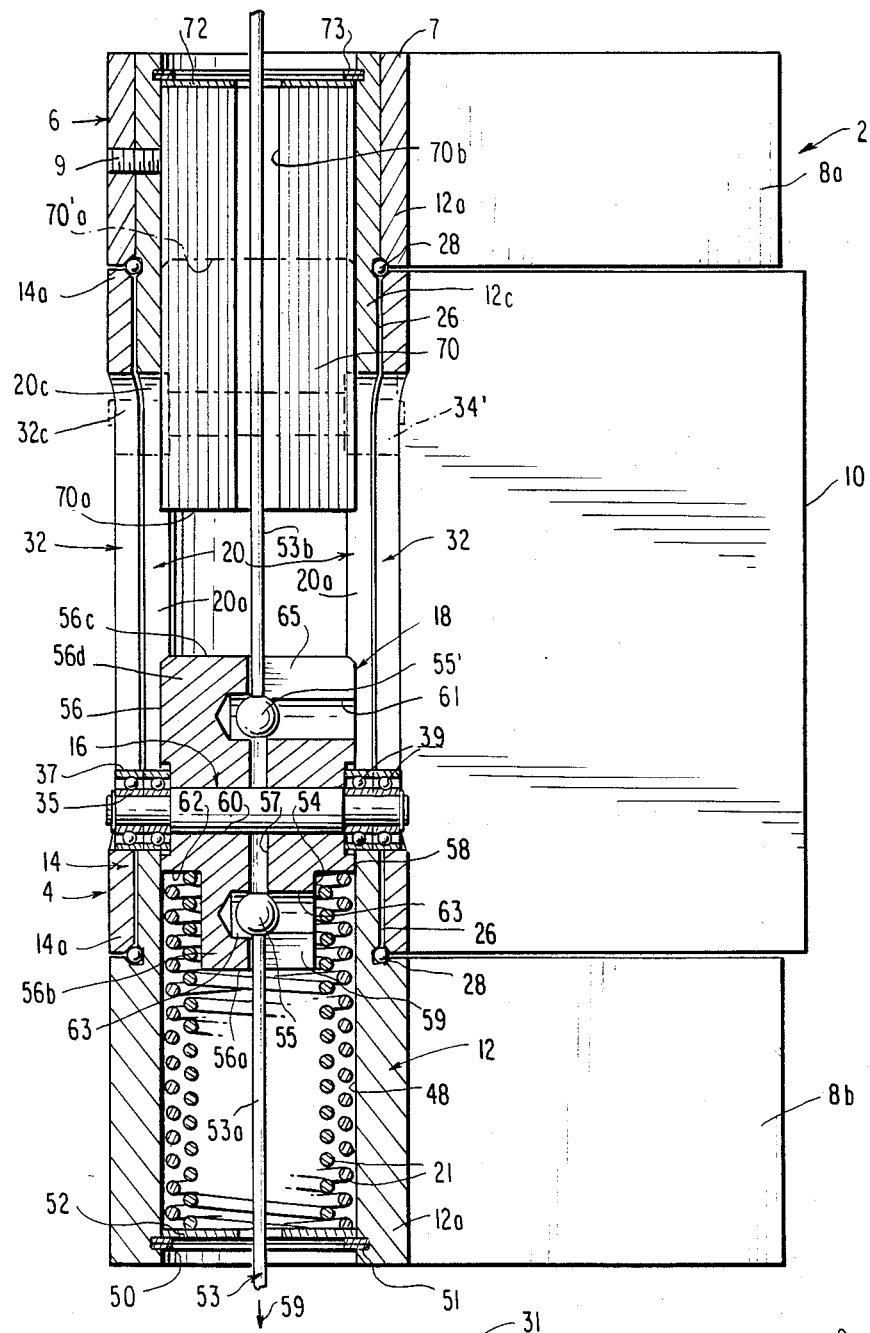
FIG. 1 is a longitudinal sectional view of the self-locking hinge in closed position, forming a preferred embodiment of the present invention.
Figure 2:
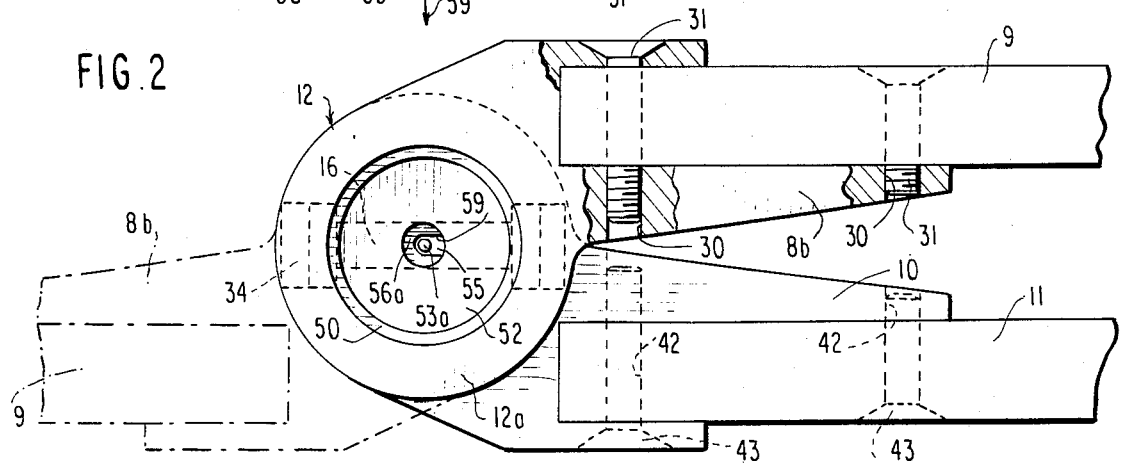
FIG. 2 is and end view of the hinge of FIG. 1.

Referring initially to FIGS. 1 2, and 3, the present invention has application to rotary deployment devices particularly useful in the deployment of a solar panel relative to a spacecraft housing the same, and more generally, to a cam actuated self-locking hinge constituting such rotary deployment device. The cam actuated self-locking hinge, indicated generally at 2, consists of two principal components: a first or outer hinge element or member 4 and a second or inner hinge element or member 6. Hinge element 4 is constituted by an outer tube, indicated generally at 14 and integral hinge plate 10. Hinge element 6 is formed by an inner tube, indicated generally at 12 and a pair of hinge plates 8a, 8b. Hinge plate 8a integrates with a sleeve 7 fitted concentrically or reduced diameter portion 12c of inner tube 12 and fixed thereto by set screw 9 threaded therebetween. Removal of sleeve 7 allows outer tube 14 to be assembled on inner tube 12. Additional components of the cam actuated self-locking hinge for a rotary deployment device, other than the inner and outer tubes 12, 14, are a cross-shaft, indicated generally at 16, an axially movable cylindrical cross roller bearing block, indicated generally at 18, and in the illustrated embodiment, a pair of compression coil springs 21.

Inner tube 12 is formed as a cylindrical body having radially enlarged ends at 12a, which tube is recessed internally at 26, within which, at the recess ends, are positioned antifriction ball bearings 28. The bearings 28 function to rotatably support the outer tube 14 at its ends 14a relative to the inner tube 12. Extending radially outwardly of the inner tube 12 are first hinge plates 8a, 8b, hinge plate 8b being integral with inner tube 12. Hinge plates 8a, 8b may be attached to one solar panel 9 to be radially displaced from a position parallel to a second solar panel 11 to which, in this case, outer tube 14 is suitably mechanically connected via hinge plate 10. Holes are provided at 30 within hinge plates 8a, 8b, FIG. 2, receiving screws 31 or like fasteners for mounting the solar panel thereto. To effect the desired deployment action, both the inner tube 12 and the outer tube 14 are provided with similarly configured, but contra-directional cam slots. In this respect, the outer tube 14, FIGS. 1, 3, and 4, is provided with a pair of modified S-shaped cam slots indicated generally at 32 at diametrically opposite sides, each slot 32 including a first end portion 32a which is straight, parallel to the axis of the concentric tubes 12, 14, an oblique or angulated, intermediate cam slot portion 32b as an extension thereof, with the cam slot 32 terminating in a further terminal or straight slot end portion 32c, parallel to that of 32a. In similar fashion, inner tube 12 has on diametric opposite sides, a pair of S-shaped cam slots 20, including straight slot end portions 20a, 20c, joined by an oblique intermediate portion 20b.

To facilitate low friction drive for the spring effected rotation of outer tube 14 relative to inner tube 12, at each end of the cross-shaft 16, there are provided rollers 34. Rollers 34 may constitute in themselves ball bearings, as shown, FIG. 1, or roller bearings, having inner races 35 fixed to the cross-shaft 16 and outer races 37 rotatable within slot 32 of outer tube 14 and corresponding contra-directional slot 20 of inner tube 12. Balls 39 are interposed between the bearing races 35, 37. Alternatively, due to temperature fluctuations experienced by the spacecraft which may be as high as 500 degrees, tubes 12, 14 may be formed of high pressure hard anodized aluminum whose opposed contacting surfaces are impregnated with Teflon lubricant thereby eliminating the anti-friction bearings.

While the tubes 12, 14 are permitted to rotate relative to each other, determined by the lateral offset between portions 32a and 32c of slot 32, and portions 20a, 20c of slot 20, the tubes 12, 14 are prevented from shifting axially. Outer tube 14 is mounted within a recess portion of inner tube 12, locked by sleeve 7. Hinge plate 10 is integral with outer tube 14 and projects radially therefrom.

Holes, as at 42, are formed within the hinge plate 10 of outer tube 14 for receiving screws 43 or other fasteners to effect mounting of solar panel 11 to the space vehicle hinge 2.

Inner tube 12 is provided with a bore as at 48 and a snap ring 50 is mounted within a radial slot 51 at one end of bore 48. Further, an aluminum washer 52 sized to bore 48 is provided within bore 48 which receives the same. Block 18 is of cylindrical form and has an annular recess 54 at one end. The annular recess 54 receives one end of each of concentric compression coil springs 21. The opposite ends of the coil springs 21 engage washer 52. In that respect, block 18 comprises a cylindrical body 56 which has an outside diameter 58 which is slightly less than the diameter of bore 48 of inner tube 12, within which it is slidably positioned. It is provided with a transverse cylindrical hole 60 within which hole, cross-shaft 16 is positioned such that the block 18 is carried by the cross-shaft 16 and is movable axially with that cross-shaft 16 as the cross-shaft 16 rides within slots 32, 20, borne by rollers 34. End 56a of block cylindrical body 56, facing washer 52, is of reduced diameter forming the peripheral recess 54 defining a shoulder 62 against which the upper ends of coil springs 21 abut. The springs 21 are captured at that end between the reduced diameter portion 56b of cylinder 56 and the bore 48 of the inner tube 12.

As may be appreciated, two coil springs 21 are provided for redundancy and are sized such that a varying compression force is exerted on the block 18 tending to drive it axially away from washer 52. The inner tube paired cam slots 20 on each side thereof are configured reversely to cam slots 32 of outer tube 14, being a mirror image of the same, as shown, but not necessarily so. They include straight line terminal or straight slot end portions 20a, at one end, which coincide with portions 32a of slots 32 within the outer tube 14, intermediate portions 20b which angle obliquely in the opposite direction to that of cam slot intermediate portions 32b; and the slots 20 finish in straight slot end portions 20c, as seen in FIGS. 3 and 4.

As may be appreciated, the linear spring force derived by one or more compression coil springs 21 is transformed into controlled torque rotating hinge plate 10 relative to the dual hinge plates 8a, 8b of the outer and inner tubes 14, 12, respectively.

Means (not shown) lock the inner tube 12 relative to the outer tube 14 with springs 21 compressed. Hinge inner tube 12 rotates relative to outer tube 14 to to the position shown in FIG. 1, and against the bias of coil springs 21. The cylindrical cross roller bearing block 18 is provided with an axial bore 57. A release cable indicated generally at 53 including segment 53a extends through washer 50 and is received by bore 55 within block 18. Cable 53 with ball 55 attached to one end thereof aligns with bore 57 by lateral insertion within slot 59 within block 18. Ball 55 is swaged to the end of cable 53 at crossbore 63. A second segment of release cable 53 enters bore 57 of block 18 from the opposite end 56c, passing through bore 70b within honeycomb element 70, and has ball 55' swaged thereto at one end thereof. It connects to an identical block of a next adjacent hinge (not shown). Large diameter portion 56d and reduced diameter portion 56b of the block 18 carry partial crossbores 61, 63, respectively. Lateral slot 65 permits cable segment 53b to place ball 55' aligned with bore 57. To effect loading of the hinge, the cable 53 is moved axially in the direction of the arrow 59, FIG. 1, by solenoid (not shown) for instance. The end of the cable segment 53a remote from hinge 10 may carry a plunger (not shown) for the solenoid. Termination of energization of the solenoid permits the bias of the coil springs 21 to drive the cross roller bearing block 18 in a direction towards crushable honeycomb material element 70, thereby rotating hinge plates 8a, 8b, and hinge plate 10, relatively, approximately 180 degrees. As may be appreciated, various alternative means may be employed for effecting initial axial shifting of block 18 in a direction towards washer 52 to load the hinge and maintain the rotary deployment device constituted by the hinge under loaded condition. Release permits the coil springs 21 to expand, driving the cross-shaft 16 with bearing mounted rollers 34 longitudinally, with the initial movement being from the position shown in FIGS. 1 and 2, through a short length straight lock zone portion 32a, 20a, FIGS. 4, 5, for the dual cam slots 32 to each side of outer tube 14 and cam slots 20 of inner tube 12. This initial movement does not result in any rotation of hinges plate 8a, 8b, relative to hinge plate 10. Rather, some linear energy is expended accelerating the mass of block 18 prior to the cam followers, i.e. rollers 34 reaching the inclined portions 32b, 20b of the contra-rotational slots.

Appreciating the problem in deployment of fragile light weight solar panels 9, 11, of the effects of velocity acceleration and deceleration on hinge and panel components to prevent structural damage, the control thereof is designed into the cam slot profiles. The spring powered driving force which supplies the initial rotational starting force in the system must be resisted at the termination of rotation to stop and resecure the panels in desired locked position. The inertia of the moving panels will continue to drive the cross roller bearing block 18 forward. To stop this deploying motion, a force must be provided to react or spend this driving force. The aluminum honeycomb cell or element, indicated generally at 70, is positioned in the path of the block 18, within the inner tube 12 backed by a plate 72 fixed to inner tube 12 via a second snap ring 73.

As may be appreciated by reference to FIGS. 1, 2, when end face 56c of the block 18 reaches end face 70a of the aluminum honeycomb cell 70, deformation of the aluminum cell 70 is initiated, resisted by the honeycomb structure. Complete deceleration occurs prior to rollers 34 bottoming out within terminal end portions 32c, 20c of the slots 32, 20 within the outer and inner tubes 14, 12, respectively. The work of the deploying mechanism is absorbed by the crush of the aluminum honeycomb cell 70 positioned in the deceleration and final lock zone as defined by terminal portions 32c, 20c of slots 32, 20, respectively.

The mechanism of the present invention follows the laws of force dealing with inclined planes which are used to control the acceleration, deceleration and velocity of the elements making up the hinge structure of particular use in hinge mounting of a solar panel, when rigidly coupled to hinge plate 8, for instance. In this relationship, torque equals force times the effective radius times the contangent of the angle of inclination. When the cross roller bearing block 18 is first released, it is in straight lock cam sections or slot portions 32a, 20a, i.e. at the lower lock zone, FIG. 4, so that the only thing that is accelerated is the cross roller bearing block 18. As the rollers 34 on the cross bearing block 18 enter the cam ramp sections or oblique portions 32b, 20b, within the rotation zone, FIG. 4, for example, the angle changes from zero degrees to 0.001 of a degree, for an instant. This very small angle of 0.001 degree has a cotangent of 57,295.8. When the cotangent is multiplied by the spring force of compression coil springs 21 times the effective radius, this creates a huge torquing force to start the hinge tubes 12, 14 in rotary motion. As this curve angle changes from 0.001 to 0.01 degrees, the force drops by an order of magnitude because the cotangent is only 5729. This continues to change as the profile or ramp angle is programed into the cam slots, FIG. 4. FIG. 5 depicts the sequence of roller positions for a roller 34 travelling through a given slot 32.

The starting torque theoretically goes to infinity but due to the elasticity of all things, it amounts to taking up the backlash in the hinge 2 and its parts. The torque and spring force, when plotted against the spring displacement, takes the form shown in FIG. 6. As may be appreciated, the acceleration must equal the deceleration at the termination of movement of rollers 34 through slot portions 32b, 20b of respective slots 32, 20 of outer and inner tubes 12, 14, as at 34', FIG. 1. If this driving force is left unchecked, then as the solar panel passes through the middle point of the cam, the resisting angle would transfer back into the cross bearing block 18. The block 18 adds its force of inertia to the spring force. The solution is to provide a counter opposing force in the form of a honeycomb or alternative energy absorber material to constrain the acceleration of the cross bearing block 28 and bring it to a stop in the locked position with end face 70a of honeycomb structure 70 driven back to dotted line portion 70a, FIG. 1.

In FIG. 6, curve A shows the plot of torque versus spring displacement. Curve A in that figure shows the positive torque being generated as the rollers 34 move out from the straight sections parallel to the axis of the tubes 12, 14 under application of the springs 21 which force decreases as the springs expand from left to right. Line B is the plot of available spring force. The area defined by the sloping line B and the horizontal line C, i. e. the area of the triangle, must be compensated or absorbed. This is achieved by permitting the honeycomb to be crushed with the honeycomb stopping the block 18. In that respect, the rectangular plot lines C, D, E and F define a rectangle whose cross-sectional area equals that of the triangle created essentially by lines B and C. The vertical line D is at the initial point of impact of the honeycomb, as so indicated in FIG. 6. It should be kept in mind that negative torque is generated in bringing the hinge components to a stop. This is shown by the torque generation curve A dropping below the horizontal line C and that negative torque generation portion of the curve A essentially matching the positive torque generated initially to the point of honeycomb impact. From the plots of FIG. 6, it may be seen that in terms of representative parameters, the force supplied by the spring is at maximum with the springs fully compressed to the left of the plot and a spring force, represented by 17.5 pounds amplitude, drops to a positive 2.5 pounds at termination of movement of block 18 over a full 1.5 inch displacement of that block. The crushing force opposing movement of the block at the moment of impact, i. e. at the 0.75 inch point of spring displacement, and extending to the full displacement of 1.5 inches, involves a 25 pound counterforce. As such, the area under the triangle principally created by lines B-C equates to the honeycomb stopping force in pound inches, as seen below line C and formed by C, D, E and F.

If the honeycomb counterforce capability were only 10 pounds acted upon over the 0.75 inches, the force in pound inches resisting spring drive of the block is insufficient to stop the block in time and, appropriately, the areas between the triangle at the top and the rectangle at the bottom and to the right of the plot line D in FIG. 6 are decidedly unequal. It should be additionally kept in mind that honeycomb cores selected for force absorption purposes which are not precrushed or in which the initial contact area has not been reduced, exhibit a peak force level at impact. However, this undersirable peak can be easily eliminated by proper design.

The profile for cam slots 32, 20 may be altered to provide for custom programmed deployments or gang string releases via the release cable sections. It should be noted that one of the cam slots 32 or 209 could be a straight slot if the cam were longer or its slope increased. The deployment mechanism is readily adaptable to different torque characteristics and acceleration rates by simply varying the slope and length of the cam slots 20, 32 and spring rate for the springs (or spring) 21 employed to provide the necessary deployment force. Free play in the deployed condition may allow unwanted movement. However, as illustrated in FIG. 4, the dotted lines 20a', 20c', 32a', 32c' for respective cam slot portions 20a, 20c, 32a, 32c define an alternative tapered run out for rollers 34, thereby automatically effecting a wedging action between the rollers 34 and the slots 20, 32 to ensure locking at the one locking zone (end of cycle only). If the angle is below 15 degrees, it will cause a lock condition to occur which the springs cannot power out of, at the beginning of release. Some free play may still exist because of the impossibility of totally eliminating clearance between the rollers 34 and cross-shaft 16 bearing the same. Sliding friction between the rollers 34 and the cam slots 20, 32 may occur, but this type of friction may be minimized with surface treatment and materials employed for the components including rollers 34. A clearance gap is required between rollers and slots to permit a rolling action to occur, it will not hurt at 50% of cycle stroke.

In lieu of antifriction bearings 28 for rotatably mounting the outer cylinder 14 on inner cylinder 12, the opposed surfaces of the inner and outer tubes may be formed of high pressure hard anodyzed aluminum impregnated with Teflon lubricant and further a dry film of graphite (not shown) interposed between the opposing surfaces of these concentric tubes. As a result, irrespective of temperature fluctuations, there will be no problem of thermal seizure from dissimilar metals.

While the invention has been particularly shown and described with reference to a preferred embodiment thereof, it will be understood by those skilled in the art that various changes in form and details and application may be made therein without departing from the spirit and scope of the invention.

What is claimed is:

1. A cam actuated self-locking hinge for use in deploying a solar panel from retracted to extended position on a space vehicle, said hinge comprising:
    concentric inner and outer tubes mounted to each other for rotation about a common axis and restrained against axial movement,
    each of said tubes having at least one radially projecting hinge plate for coupling to a pair of space vehicle solar panels, respectively,
    distinctively opposed pairs of contra-rotational cam slots provided within respective tubes at common longitudinal locations,
    a cylindrical cross-roller bearing block slidably mounted internally of said inner tube for axial movement therein,
    a cross-shaft connected to said cross-roller bearing block having ends extending through the cam slots of the tubes,
    means for biasing said block towards one end of said inner tube thereby tending to effect a stroke for said block to rotate the tubes relative to each other and the hinge members between one of hinge open and hinge closed positions,
    and means for shifting said block axially against said biasing means to load said hinge,
    the improvement wherein:
    said pairs of contra-rotational cam slots each include unitary, offset straight slot end portions in line with the axis of the concentric tubes and an intermediate portion at some angle to said straight slot end portions and joining the same;
    whereby, the intermediate portion controls the acceleration, the displacement, velocity, acceleration and deceleration of the hinge plates relative to each other and the straight end portions in line with the axis of the tubes control locking of said inner and outer tubes together at the beginning and the end of the stroke, and said self-locking hinge further comprising an energy absorber within said inner tube operatively engaging the slidable cross-roller bearing block to absorb the energy of the cross-roller bearing block during termination of cross-shaft movement within at least one of said cam slot straight end portions.

2. The self-locking hinge as claimed in claim 1, wherein said energy absorber comprises a mechanically crushable material mounted in the path of said block.

3. The self-locking hinge as claimed in claim 2, wherein said mechanically crushable material constitutes a honeycomb element.

4. A cam actuated self-locking hinge for use in deploying a solar panel from retracted to extended position on a space vehicle, said hinge comprising:
    concentric inner and outer tubes mounted to each other for rotation about a common axis and restrained against axial movement,
    each of said tubes having at least one radially projecting hinge plate for coupling to a pair of space vehicle solar panels, respectively,
    distinctively opposed pairs of contra-rotational cam slots provided within respective tubes at common longitudinal locations,
    a cylindrical cross-roller bearing block slidably mounted internally of said inner tube of axial movement therein,
    a cross-shaft connected to said cross-roller bearing block having ends extending through the cam slots of the tubes,
    means for biasing said block towards one end of said inner tube thereby tending to effect a stroke for said block to rotate the tubes relative to each other and the hinge members between one of hinge open and hinge closed positions,
    and means for shifting said block axially against said biasing means to load said hinge,
    the improvement wherein:

said pairs of contra-rotational cam slots each include unitary, offset straight slot end portions in line with the axis of the concentric tubes and an intermediate portion at some angle to said straight slot end portions and joining the same;

whereby, the intermediate portion controls the acceleration, the displacement, velocity, acceleration and deceleration of the hinge plates relative to each other and the straight end portions in line with the axis of the tubes control locking of said inner and outer tubes together at the beginning and the end of the stroke and wherein opposed sides of said straight slot end portions taper towards each other in a direction away from the slot oblique intermediate portion, such that the cross-shaft ends become wedged in the straight slot end portions to facilitate locking of the hinge at both hinge plate open and closed positions.

* * * * *